(12) United States Patent
Aigouy et al.

(10) Patent No.: US 8,427,082 B2
(45) Date of Patent: Apr. 23, 2013

(54) METHOD FOR ABSORBING THE DISPLACEMENT OF A PLUNGER IN A LINEAR ELECTRODYNAMIC MOTOR UNDER THE INFLUENCE OF AN EXTERNAL FORCE

(75) Inventors: Gerald Aigouy, Crolles (FR); Jonathan Buquet, La Murette (FR); Thierry Trollier, Eybens (FR)

(73) Assignee: L'Air Liquide Societe Anonyme pour l'Etude et l'Exploitation des Procedes Georges Claude, Paris (FR)

( * ) Notice: Subject to any disclaimer, the term of this patent is extended or adjusted under 35 U.S.C. 154(b) by 266 days.

(21) Appl. No.: 12/516,826

(22) PCT Filed: Oct. 10, 2007

(86) PCT No.: PCT/FR2007/052115
§ 371 (c)(1),
(2), (4) Date: May 29, 2009

(87) PCT Pub. No.: WO2008/068433
PCT Pub. Date: Jun. 12, 2008

(65) Prior Publication Data
US 2010/0066276 A1 Mar. 18, 2010

(30) Foreign Application Priority Data
Dec. 5, 2009 (FR) ...................................... 06 55325

(51) Int. Cl.
*H02K 33/00* (2006.01)
(52) U.S. Cl.
USPC ........... 318/114; 318/135; 318/611; 318/623; 318/702; 310/14; 310/34; 310/138; 188/287; 188/313; 188/282.5; 188/322.15; 188/317; 91/419; 91/131; 91/134; 60/636; 60/638; 60/520

(58) Field of Classification Search .................. 318/135, 318/611, 623, 702; 310/14, 34, 138; 188/287–313, 188/282.5, 280, 317, 322.15; 91/5, 131, 91/134, 419.441; 62/6; 417/44.1, 417, 534; 60/363, 638, 520
See application file for complete search history.

(56) References Cited

U.S. PATENT DOCUMENTS

| 2,991,028 A | * | 7/1961 | Sedgfield et al. | ........... 244/76 R |
| 5,007,659 A | * | 4/1991 | Guy | ........................... 280/5.515 |
| 5,836,165 A | * | 11/1998 | Champion et al. | .................. 62/6 |

(Continued)

FOREIGN PATENT DOCUMENTS

| GB | 2 318 887 | 5/1998 |
| JP | 57162972 | 10/1982 |

(Continued)

OTHER PUBLICATIONS

PCT/FR2007/052115 Search Report.

*Primary Examiner* — Walter Benson
*Assistant Examiner* — Jorge Carrasquillo
(74) *Attorney, Agent, or Firm* — Christopher J. Cronin

(57) ABSTRACT

The invention relates to a method for absorbing the displacement, under the influence of an external force, of at least one plunger (10,20) in a linear electrodynamic motor comprising a least an induction coil (11, 21) magnetically coupled with the plunger. Said method comprises the steps of: detecting in said induction coil a current induced ($I'_{ind}$) amplified relative to the induced current. The invention can be applied to cryogenic machines on board space ships.

7 Claims, 3 Drawing Sheets

U.S. PATENT DOCUMENTS

| | | | |
|---|---|---|---|
| 6,094,912 A | 8/2000 | Williford | |
| 6,231,310 B1 * | 5/2001 | Tojo et al. | 417/44.1 |
| 2003/0026701 A1 | 2/2003 | Yoo et al. | |
| 2004/0195062 A1 * | 10/2004 | Anderfaas et al. | 188/267.2 |
| 2004/0234394 A1 * | 11/2004 | Duncan et al. | 417/415 |
| 2006/0170888 A1 | 8/2006 | Asano | |

FOREIGN PATENT DOCUMENTS

| | | | |
|---|---|---|---|
| JP | 57162972 A | * | 10/1982 |
| JP | 2002252959 | | 9/2002 |
| JP | 2002252959 A | * | 9/2002 |

* cited by examiner

METHOD FOR ABSORBING THE DISPLACEMENT OF A PLUNGER IN A LINEAR ELECTRODYNAMIC MOTOR UNDER THE INFLUENCE OF AN EXTERNAL FORCE

This application is a §371 of International PCT Application PCT/FR2007/052115, filed Oct. 10, 2007.

FIELD OF THE INVENTION

The present invention relates to a method of damping the displacement, under the action of an external force, of at least one piston of a linear electrodynamic engine. The invention also relates to a power-supply circuit for an induction coil of a linear electrodynamic engine for the implementation of said method.

The invention has a particularly advantageous application in the field of alternating cycle cryogenic machines, Stirling engines or pulsed gas tubes employing linear electrodynamic engines with pistons, and more particularly cryogenic machines designed to be loaded on board spacecraft such as earth observation satellites. In this application, the linear electrodynamic engines play the role of compressor for the fluid used, for example helium.

BACKGROUND

The working principle of a linear electrodynamic engine is based on the generation, by induction coils, of cyclic magnetic forces that stimulate with a straight movement at least one movable mass, or piston, mounted on a mechanical bearing, which due to its construction develops an axial elastic return force proportional to the displacement of the piston. The latter is therefore characterized by a mechanical resonant frequency determined by the movable mass, the stiffness of the bearing, the magnetic stiffness and the fluid load.

The control of the engine then consists in applying to the induction coils an excitation current at the mechanical resonant frequency of the piston and its bearing, so as to obtain a natural amplification of the displacement movement of the piston.

However, the efficiency of such a mechanism depends largely on the damping forces, in particular friction forces, that tend to oppose the movement of the piston proportionally to its speed. In fact, the optimum performance is obtained when the natural amplification at the mechanical resonance is at a maximum, i.e. when the damping forces of the piston are at a minimum. For this reason, great efforts have been made during the design of this type of engine in order to minimize the causes of damping at the piston.

As a result, therefore, such engines have very low damping properties, which makes them particularly sensitive to external mechanical stresses, especially vibrations and impacts. This is because every vibration or impact applied to the interfaces of the engine close to the mechanical resonant frequency is amplified by the piston. This converts into large amplitude oscillations of the piston, greater than the physical limits imposed by the size of the compressor. Internal impacts may then be produced between the piston and the mechanical stops of the compressor, thus producing different types of damage capable of impairing the performance of the engine in terms of efficiency and lifetime.

It will be understood that these drawbacks are particularly disadvantageous in the case of engines that are to be loaded on spacecraft. The severe mechanical environment during the launch of the craft indeed cause vibrations and repeated impacts of the pistons of the engine against the compressor case. In addition, taking account of the lifetimes demanded, of 5 to 10 years, it is not only necessary to pass through the launch step without damage, but also to ensure optimum operation throughout the complete duration of the mission. Yet, the impacts undergone throughout the duration of the launch do not make it possible to guarantee these objectives and constitute a potential cause of mission failure.

Various solutions have already been proposed for limiting the displacement of the pistons of linear electrodynamic engines when they are stressed by external forces such as impacts and vibrations.

A first solution consists in short-circuiting the induction coils of the engine. When the piston is set in motion by external mechanical loads, the magnetic flux in the coils varies and, if the coils are short-circuited, a counter-electromotive force appears in the coils according to Lenz's Law and generates a magnetic force that opposes the displacement of the piston, which creates damping.

However, in this known solution the magnetic force generated remains low and insufficient to damp high vibration levels, all the more so as it is defined by the fixed physical dimensions of the coils and of the magnets and is therefore not adjustable.

A second solution proposes employing position sensors in the compressor in order to know the position and the speed of the pistons at every moment. Control electronics interpret this information and provide the electrical energy necessary to keep the pistons in their neutral position.

The drawbacks of this solution are an employment of position sensors that is difficult, expensive and risky in terms of reliability and lifetime, along with control electronics that are complex and also expensive.

A third solution consists in introducing a mechanism for blocking the piston into the compressor.

This third solution is very difficult to implement in practice and risky in terms of reliability.

SUMMARY OF THE INVENTION

The present invention provides a method of damping the displacement, under the action of an external force, of at least one piston of a linear electrodynamic engine comprising at least an induction coil to which the piston is magnetically coupled. The method comprises the steps of detecting a current ($I_{ind}$) in the induction coil induced by the displacement of the piston and generating and applying to the induction coil a damping current ($I'_{ind}$) amplified in relation to the induced current. The present invention further provides a power-supply circuit to implement this method and for the application of this method and power-supply circuit to linear electrodynamic engines on board spacecraft.

DETAILED DESCRIPTION OF THE INVENTION

Figure 1:
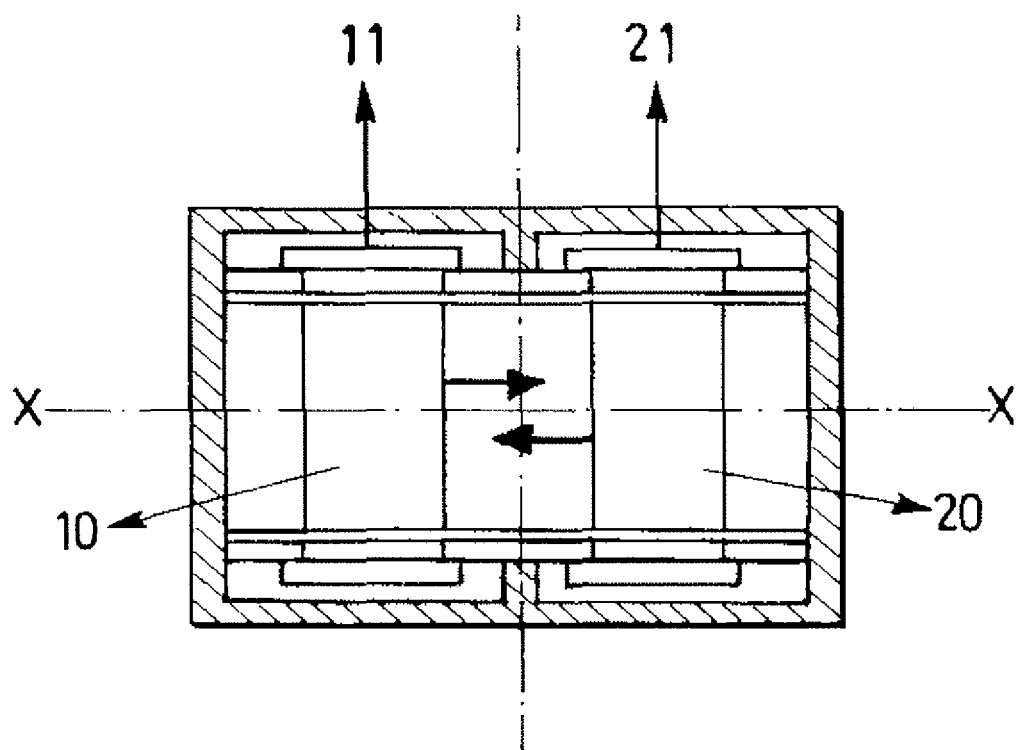
FIG. 1 is a simplified cross-sectional view of a linear electrodynamic engine.

Hence, one aim of the invention is to propose a method of damping the displacement, under the action of an external force, of at least one piston of a linear electrodynamic engine comprising at least an induction coil to which the piston is magnetically coupled, which would make it possible for the amplitude of the damping force generated to be adjustable to the intensity of the external force applied to the piston, even when this intensity is very high, and this without making use of an intrusive implantation of additional equipment, such as position or speed sensors.

This aim is attained, according to the invention, due to the fact that said method comprises the steps consisting in:

detecting a current in said induction coil induced by said displacement of the piston; and generating and applying to the induction coil a damping current amplified in relation to said induced current.

Similarly, a power-supply circuit for an induction coil of a linear electrodynamic engine for the implementation of the method according to the invention is noteworthy in that said power-supply circuit comprises:

a voltage source intended to provide an excitation current to said induction coil;

a first current detection module capable of providing a first signal proportional to said excitation current;

a second current detection module capable of providing a second signal proportional to a current amplified in relation to said excitation current; and a differential amplifier capable of providing and applying to said voltage source a control signal proportional to the difference between said first and second signals respectively provided by said first and second detection modules.

Thus it will be understood that the invention makes it possible to limit the displacement of the piston due to the vibrations and the impacts by introducing active damping of the movement of the piston. This additional damping is produced by means of the engine, which generates a magnetic force opposing the movement of the piston proportional to its speed. It is not therefore an active control of the displacement of the piston, for example by means of sensors, but a self-regulating damping force which amplifies itself with the displacement speed of the piston.

It will also be noted that the damping sought is produced by a device external to the engine, not requiring any particular internal arrangement nor any mechanism that might reduce the reliability thereof.

Furthermore, the associated electronic circuit is reduced to an amplification system that is simple to design and inexpensive in comparison with dedicated control electronics.

The following description with regard to the appended drawings, provided by way of nonlimiting examples, will allow it to be better understood what the invention consists of and how it can be produced.

For a further understanding of the nature and objects for the present invention, reference should be made to the detailed description, taken in conjunction with the accompanying figures, in which like elements are given the same or analogous reference numbers.

FIG. 1 shows a linear electrodynamic engine intended, for example, to be integrated as a compressor in an alternating cycle cryogenic machine of the Stirling type, a pulsed gas tube, or other, and into continuous flow cryogenic machines of the Joule-Thomson type. The engine of FIG. 1 comprises two pistons 10, 20 responsible for compressing a cryogenic fluid, such as helium.

In operation, the two pistons 10, 20 are displaced in opposite directions parallel to the axis X-X of the engine in an alternating movement, the frequency of which is chosen to be approximately equal to the resonant frequency $f_0$ of the electric engine assembly and its fluid load, this frequency $f_0$ being essentially defined by the movable mass, the stiffness of the bearings, the magnetic stiffness and the fluid load. A typical resonant frequency value is, for example, 50 Hz. At this frequency the amplitude of the movement of the pistons is then at a maximum and is limited only by the damping forces due to the various mechanical frictions, which are made as low as possible for maximum efficiency of the engine.

Moreover, the alternating movement of the pistons is obtained by applying a periodic excitation current at the resonant frequency $f_0$, here 40 Hz, to the induction coils 11, 21. The magnetic coupling of the pistons 10, 20 with the coils 11, 21 is produced by means of permanent magnets borne by the pistons.

Out of operation, in particular during the launch phase of a spacecraft, in which the engine of FIG. 1 is loaded, the pistons are free and, hence, may be the seat of external forces from vibrations and impacts whose component at a resonant frequency $f_1$, corresponding to a case without a fluid load, is naturally amplified, all the more so as the damping is very weak due to the fact that in this configuration the fluid load on the compressor is negligible. Everything happens as if the compressor did not contain any fluid capable of opposing the movement of the pistons with a hydrodynamic resistance. The amplitude of the displacement of the pistons then becomes very large, exceeding the maximum permitted stroke. The result of this is a risk of impacts of the pistons against the mechanical stops of the compressor, which may lead to serious reductions in engine performance.

Figure 2:
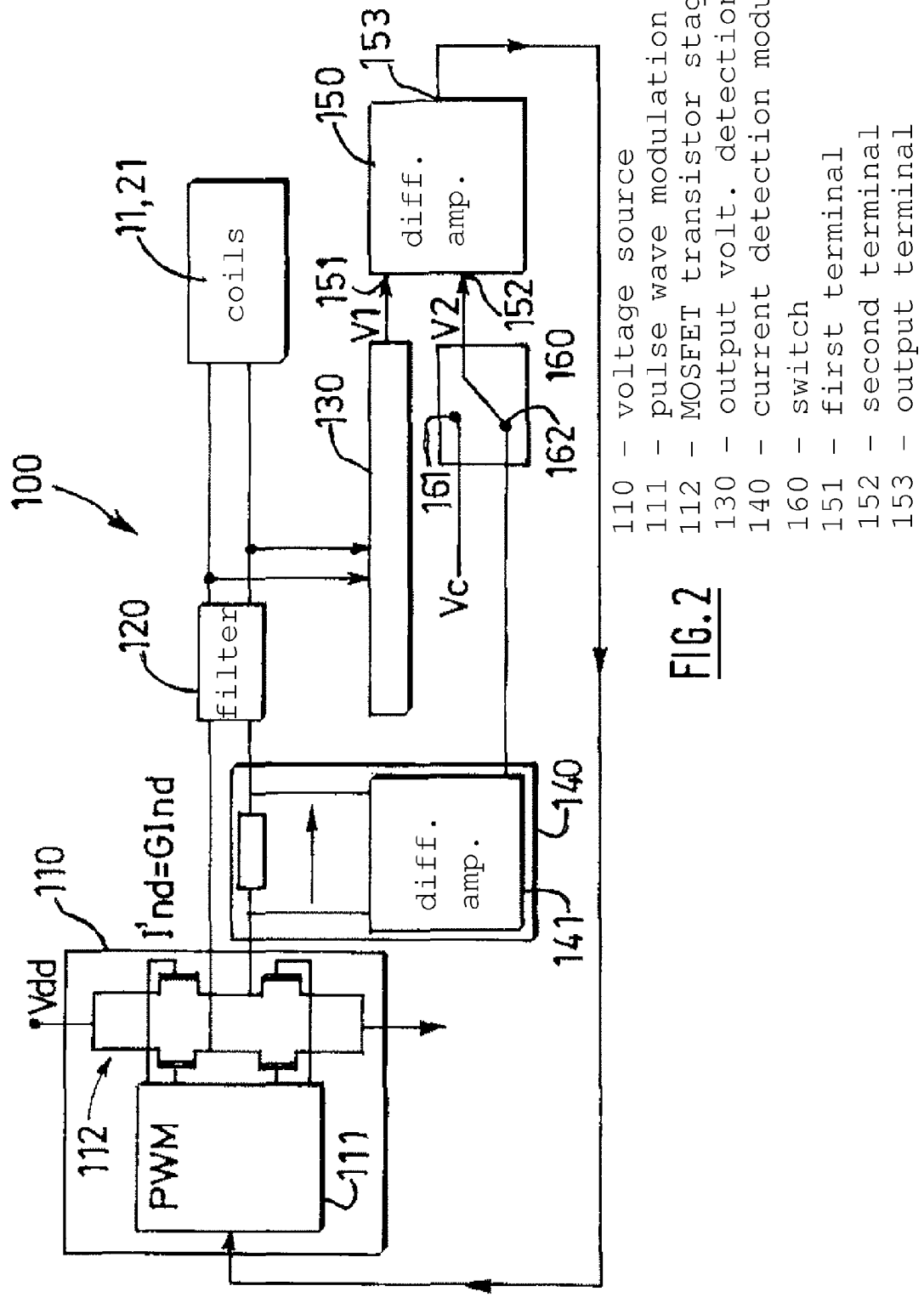
FIG. 2 is a diagram of a power-supply circuit for the induction coils of the engine of FIG. 1.

In order to improve this situation, the invention proposes to use a power-supply circuit for the induction coils 11, 21 of the type of that shown in FIG. 2.

Generally speaking, this circuit makes it possible, on the one hand, to provide the coils with the excitation current necessary for nominal operation of the engine and, on the other hand, to damp the displacement of the pistons when the engine is not in operation, the pistons being mounted freely, for example during a launch phase. The damping of the displacement of the pistons is obtained by implementing a method consisting, in a first period, of detecting a current in the induction coils 11, 21 induced by the displacement of the pistons, then in generating and applying to the induction coils a damping current amplified in relation to the induced current. This damping current produces an electromagnetic force on the pistons opposed to the movement and the amplitude of which varies proportionally to the speed of displacement of the pistons with a proportionality coefficient equal to the amplification gain applied. It is therefore a self-regulating and adjustable damping mechanism, the gain of which may be chosen at will depending on the characteristics of the engine and of the environment considered.

To this end, the power-supply circuit 100 of FIG. 2 comprises a voltage source 110 comprising a PWM (Pulse Wave Modulation) modulation stage 111 intended to control the switching of a MOSFET transistor stage 112.

In nominal operation of the engine, i.e. during a space mission for example, the voltage source 110 provides the coils 11, 21 with the excitation current necessary for the displacement of the pistons 10, 20. The current delivered by the source 110 is therefore filtered at the resonant frequency $f_0$ of the pistons by a filter 120 centered around this frequency.

Whatever the mode of operation of the engine, whether nominal or in the launch phase, a first module 130 for detecting the output voltage provides a first signal $V_1$ with a voltage proportional to the excitation current at a first input terminal 151 of a differential amplifier 150.

A second terminal 152 of the differential amplifier 150 receives a second signal $V_2$ with a voltage that depends on the mode of operation considered.

In nominal operation the switch 160 is located in the position 161 and the signal $V_2$ is a set voltage $V_c$ at the resonant frequency $f_0$. The value of this voltage $V_c$ is defined depending on the required power needs. It will be understood that if the output voltage $V_1$ becomes different from its set value $V_2$ ($=V_c$), the differential amplifier 150 provides, at an output terminal 153, an error signal capable of controlling the voltage source 110 so as to restore the output voltage $V_1$ to its nominal set value $V_2$ ($=V_c$). The power-supply circuit 100 therefore operates in a feedback loop on the output voltage $V_1$.

In the launch phase the switch 160 is located in the position 162 and the second voltage signal $V_2$ is this time provided by a second current detection module 140 comprising a shunt resistor $R_s$ located on the power-supply circuit. The current passing through the resistor $R_s$ is converted into a voltage, which is amplified by a differential amplifier 141. This voltage $V_2$ is then compared with the output voltage $V_1$ in the same way as in the case of nominal operation. Thus, when the pistons 10, 20 are displaced under the effect of vibrations or impacts during the launch phase, an induced current $I_{ind}$ is produced in the coils 11, 21 according to Lenz's Law. The module 140 detects this induced current and provides the corresponding voltage $V_2$ at the input terminal of the differential amplifier 150. The voltage source 110 then receives a signal of an error between the output voltage $V_1$ and the voltage $V_2$ from the differential amplifier 150. The voltage source 110 then provides the coils 11, 21 with the voltage corresponding to an excitation current $I'_{ind}=G.I_{ind}$ amplified by a gain factor G in relation to the induced current $I_{ind}$. This amplified excitation current exerts a Laplace force on the pistons 10, 20 opposing their movement. This results in a damping of the displacement of the pistons which is larger as the amplification gain G is large. The power-supply circuit 100 operates in this case in a self-regulating loop that is adjustable as a function of the gain G. The value of the gain G to be used is defined by the constructor from the technical characteristics of the engine and of the environment considered.

Figure 3:
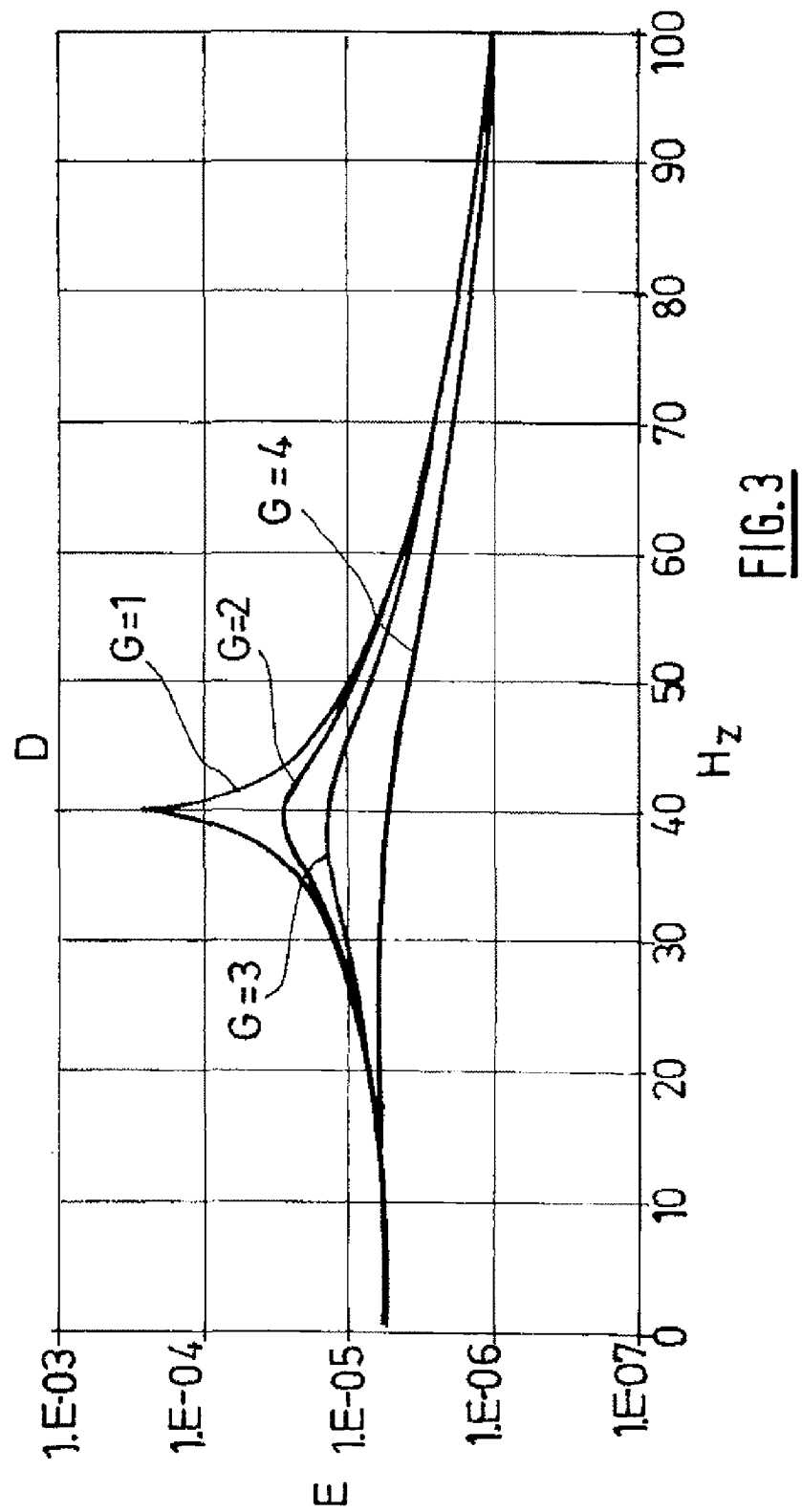
FIG. 3 is a graph giving the displacement of the piston on a logarithmic scale as a function of the vibration frequency for several values of the gain G.

The graph of FIG. 3 shows the damping of the displacement of the pistons as a function of the frequency and of the gain G, the resonant frequency $f_1$ being 40 Hz. It will be observed that the damping indeed increases when the gain increases.

What is claimed is:

1. A method of damping the displacement, under the action of an external force, of at least one piston of a linear electrodynamic engine comprising at least an induction coil to which the piston is magnetically coupled, the method comprising the steps of:
    detecting a current ($I_{ind}$) in the induction coil induced by the displacement of the piston; and
    generating and applying to the induction coil a damping current ($I'_{ind}$) amplified in relation to the induced current, wherein the displacement of the piston due to the vibrations and the impacts is limited by the introduction of an additional active damping produced by the engine, the engine generating a magnetic force opposing the movement of the piston proportional to speed of the piston.

2. A power-supply circuit for an induction coil of a linear electrodynamic engine for the implementation of the method of claim 1, wherein the power-supply circuit comprises:
    a voltage source intended to provide an excitation current to the induction coil;
    a first current detection module capable of providing a first signal ($V_1$) proportional to the excitation current;
    a second current detection module capable of providing a second signal ($V_2$) proportional to a current amplified in relation to the excitation current; and
    a differential amplifier capable of providing and applying to the voltage source a control signal proportional to the difference between said first and second signals respectively provided by the first and the second detection modules.

3. The power-supply circuit of claim 2 comprising two pistons displaced in opposite directions parallel to the axis of the engine in an alternating movement by applying a periodic excitation current to two induction coils, wherein first current detection module detects the output voltage delivered by the voltage source to the coils, the second current detection module detecting the induced current ($I_{ind}$) produced in the coils when the piston is displaced under the effect of vibrations or impacts.

4. The power-supply of claim 3, wherein the voltage source is adapted to provide the coils with a voltage corresponding to an excitation current ($I'_{ind}=G(I_{ind})$) amplified by a gain factor G in relation to the induced current ($I_{ind}$).

5. The power-supply of claim 4, wherein the power-supply circuit operates a self regulating loop adjustable as a function of the gain.

6. The method of claim 1, wherein the method is used in linear electrodynamic engines on board spacecraft.

7. The power-supply circuit of claim 2, wherein the power-supply circuit is used in linear electrodynamic engines on board spacecraft.

* * * * *